United States Patent [19]

McWilliams

[11] 4,221,672
[45] Sep. 9, 1980

[54] THERMAL INSULATION CONTAINING SILICA AEROGEL AND ALUMINA

[75] Inventor: Joseph A. McWilliams, Worcestershire, England

[73] Assignee: Micropore International Limited, Droitwich, England

[21] Appl. No.: 877,543

[22] Filed: Feb. 13, 1978

[51] Int. Cl.² ............................................. C04B 43/02
[52] U.S. Cl. ...................................... 252/62; 219/464; 252/63.2; 428/308; 428/446
[58] Field of Search .................... 252/62, 63.2; 106/65, 106/73.4

[56] References Cited

U.S. PATENT DOCUMENTS

| | | | |
|---|---|---|---|
| 3,094,385 | 6/1963 | Brisbin et al. | 252/62 X |
| 3,634,250 | 1/1972 | Commons | 252/62 |
| 3,833,793 | 9/1974 | McWilliams et al. | 219/464 |
| 3,835,054 | 9/1974 | Olewinski et al. | 106/65 X |
| 3,869,334 | 3/1975 | Hughes et al. | 252/62 X |
| 3,996,145 | 12/1976 | Hepburn | 252/62 |

FOREIGN PATENT DOCUMENTS

| | | | |
|---|---|---|---|
| 549675 | 12/1957 | Canada | 252/62 |
| 1247673 | 9/1971 | United Kingdom . | |
| 1247674 | 9/1971 | United Kingdom . | |
| 1350661 | 4/1974 | United Kingdom . | |

Primary Examiner—Harris A. Pitlick
Attorney, Agent, or Firm—Pollock, Vande Sande & Priddy

[57] ABSTRACT

A material having good thermal insulation properties can be made from an intimate mixture of a microporous silica aerogel, a ceramic fibre material and optionally an opacifier. According to the invention alumina is added to those mixtures, e.g. in the form of alumina particles or alumina fibres constituting all or part of the ceramic fibre material. The resulting materials have a reduced tendency to sinter and consequently shrink at high temperatures.

16 Claims, 1 Drawing Figure

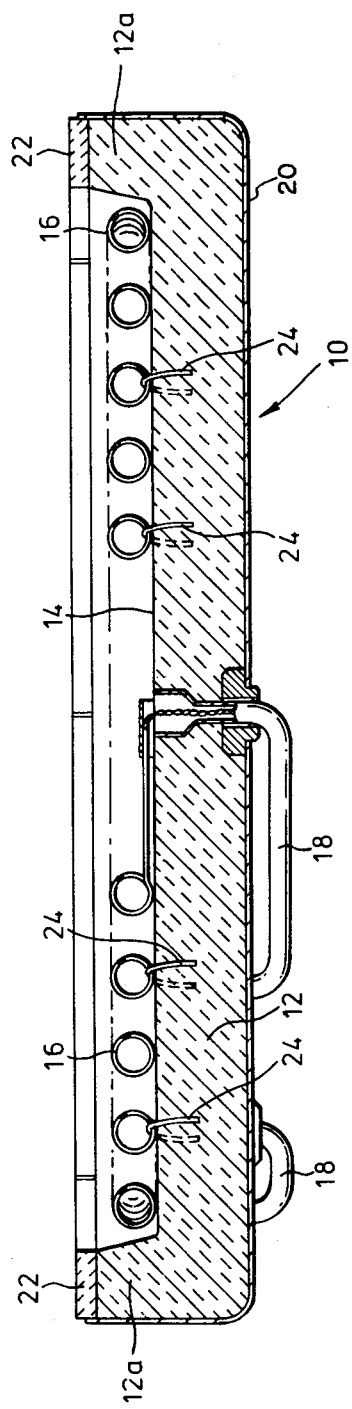

THERMAL INSULATION CONTAINING SILICA AEROGEL AND ALUMINA

This invention relates to thermal insulation material.

BACKGROUND OF THE INVENTION

A material of excellent thermal insulation properties can be made from a mixture of finely divided microporous silica aerogel, a reinforcing fibre such as alumina silicate and optionally a separate particulate opacifier. Such materials give excellent heat insulation when compacted under pressure and self bonded with or without the use of extra bonding agents to a density in the range 10 to 30 lb/ft$^3$ and are useful also as a base layer of thermal and electrical insulating material such as in heating units for smooth top electric cooker hobs as illustrated, for example, in our United Kingdom Pat. No. 1433478.

When such a material is used at high temperatures it is found to sinter and consequently shrink. This is most undesirable since shrinkage leads to the formation of cracks and air gaps whose insulating properties are much inferior to the material itself. Materials such as described above have a limiting temperature at which they are useful of about 1000° C. since above that temperature there is progressive sintering and shrinkage.

Until now it had been assumed that such temperatures were the highest temperature at which these materials could be useful. This view was based on the facts that, of the three components noted above, silica, even when it is used in a form which is as pure as possible, has the lowest temperature at which it starts to sinter and shrink significantly, and it is present in the mixture in by far the largest amount both by weight and by volume.

BRIEF SUMMARY OF THE INVENTION

We have now found according to the invention that the highest temperature to which such insulating materials can be used in practice can be increased by incorporating alumina into these mixtures. Therefore according to the present invention there is provided heat insulating material comprising an intimate mixture of microporous silica aerogel and reinforcing fibres, the mixture containing alumina in an amount of up to 12% by weight.

This heat insulating material of the invention is found to undergo less shrinkage when used at the same high temperatures as prior materials and in addition it can often be used at temperatures which are as much as 100° C. higher than existing materials while still suffering only an acceptable degree of shrinkage. Often therefore the materials of the invention can be used at temperatures as high as 1100° or even 1200° C. without shrinkage due to sintering being too serious.

This is surprising when alumina fibres are used as the reinforcing fibres since the reinforcing fibres had been included merely to impart mechanical strength to the compacted material. Additionally, when fibres such as glass fibres or mineral wool fibres were tried in place of the alumina silicate high shrinkage occurred at relatively low temperature, e.g. around 700° C. Therefore the fibres previously used were chosen so as to be stable to at least the temperature at which significant sintering of silica occurs and to be readily available commercially. It is also somewhat surprising that the addition of alumina particles to the mixture gives this reduced shrinkage since the silica and other components can remain unchanged.

Microporous silica aerogel is a gel in which the liquid phase has been replaced by a gaseous phase in such a way as to avoid the shrinkage which would occur if the gel had been dried directly from a liquid. A substantially identical structure can however be obtained by controlled precipitation from a silica solution, the temperature and pH being controlled during precipitation to obtain an open lattice precipitate. The term "microporous silica aerogel" as used herein is deemed to include not only microporous silica aerogel as described above, but also equivalent microporous open lattice silica structures, such as fumed pyrogenic or electrothermal types in which the average ultimate particle size is less than 100 millimicrometers. These materials can be made by the high temperature hydrolysis of a silicon tetrahalide such as silicon tetrachloride.

An example of a suitable microporous silica aerogel is the product which is commercially available from Degusa GmbH under the Trade Name Aerosil. Other suitable microporous silica aerogels are available under the name Cabosil from Cabot Corporation and Santosel from Monsanto.

The mixtures according to the invention preferably additionally contain a separate opacifier intimately mixed with the aerogel. Thus in certain circumstances one of the other components may function as an opacifier, e.g. carbon fibres. Examples of separate opacifiers are phase-stabilized black ferrosoferric oxide, titanium dioxide, chromium dioxide, rutile zirconium oxide, iron oxide, manganese dioxide, ilmenite or carbon black. The amount of opacifier is preferably within the range of from 2 to 100% of the weight of the silica aerogel, and more preferably from 5 to 80% of the weight of the silica aerogel.

As noted above the alumina can be present as an additional separate component, can be present as the, or part of the fibre, or can be present both as the, or part of the fibres and as an additional separate component.

In cases where the or some of the alumina is present as the fibre, alumina fibres used should contain at least 90% and preferably at least 95%, by weight of alumina. Examples of suitable alumina fibres are those which are sold under the Trade Mark Saffil by Imperial Chemical Industries Limited.

As noted above the reinforcing fibres usually constitute only a relatively small proportion of the materials of the invention and within such limits, the greater the proportion of alumina fibres the less appears to be the shrinkage of the resulting material at high temperatures. However, the proportion of ceramic fibres to be included is limited inter alia by a reduction of thermal insulating properties with increasing proportions of ceramic fibre and by problems of mechanical strength of the material particuarly when moulded. It appears therefore that about 12 and preferably about 10% by weight of alumina fibres is a practical upper limit while a more preferred proportion of alumina fibres to be added is in the range of from 1 to 7% by weight of the total material.

Not all the fibres within the materials of the invention need to be alumina fibres. Instead part of the presently used alumina silicate fibres or other fibres such as quartz fibres can be replaced by alumina fibres. The relative proportion of alumina fibres to total fibres is preferably from 6 to 100% by weight.

When the materials of the invention contain microporous silica aerogel, at least some alumina fibre and opacifier, the preferred and most preferred percentages by weight of those components are as follows:

|  | preferred | most preferred |
|---|---|---|
| silica aerogel | 50-97 | 60-73 |
| total fibre | 1-10 | 2-7 |
| opacifier | 2-40 | 25-40 |

Instead of using alumina fibres or in addition to alumina fibres, finely divided alumina as an additional component can be included. As with the fibres the alumina used should contain at least 90%, and preferably at least 95%, by weight of alumina. An example of a suitable alumina powder is that sold under the Trade Name Alox by Degussa GmbH.

When the materials of the invention contain microporous silica aerogel, ceramic fibre which may or may not include alumina, opacifer and alumina as an additional component, the preferred and most preferred percentages by weight of those components are as follows:

|  | preferred | most preferred |
|---|---|---|
| silica aerogel | 50-97 | 60-72 |
| fibre | 0.5-10 | 2-7 |
| opacifier | 2-40 | 25-40 |
| alumina | 0.5-10 | 1-5 |

The materials of the invention can be used in the production of insulating materials and particularly panels as described in our United Kingdom Pat. Nos. 1350661 and No. 1247674 to which reference is made for a full description as to the preparation of such panels from the thermal insulating material.

Therefore according to one embodiment of the present invention there is provided insulation in the form of a porous envelope of fibrous material packed with material which is an intimate mixture of microporous silica aerogel, reinforcing fibres, and optionally an opacifier, the material containing alumina in an amount up to 12% by weight.

According to another embodiment of the present invention there is provided a thermal insulating panel comprising an outer porous envelope containing a pressure consolidated block of thermal insulating material which is an intimate mixture of microporous silica aerogel, reinforcing fibres, and optionally an opacifier, the material containing alumina in an amount of up to 12% by weight, the material of the envelope being in a state of tension and the block being bonded during consolidation to the envelope partly by penetration of the particles of the insulating material on the outer surface of the block into the pores of the envelope having taken place under pressure.

Reference is also directed to those U.K. Pat. Nos. 1350661 and 1247674 and to our United Kingdom Pat. No. 1247673 for further details of the silica aerogel, and suitable opacifiers and fibres.

The thermal insulating material according to the invention can also be used as an electrical and thermal insulating material in electrical heating units. Examples of such units are heater units for smooth top cooker hobs particularly those where a coiled bare wire heating element rests on or is partially embedded in the insulating layer. The material of the invention is particularly useful as the supporting layer of thermal and electrical insulating material in the heating units described and claimed in our United Kingdom Pat. No. 1433478 to which reference is made for a full description.

According to a preferred aspect of the present invention however we find that improved smooth top cooker hob heating elements can be prepared using the insulating materials of the invention without the presence of an intermediate layer of bonded ceramic fibres as shown in our above noted United Kingdom Pat. No. 1433478. This has the advantage that the heating element can be made somewhat smaller in overall depth because of the elimination of this layer of bonded ceramic fibres.

Therefore, according to a preferred aspect of the present invention there is provided an electrical heating unit for a smooth top cooker hob comprising a supporting layer of thermal and electrical insulating material directly supporting an electrical heating element which is in the form of a helically coiled bare wire and which is secured to the insulating material by metal wire staples which engage over parts of the wire convolutions adjacent to the surface of the supporting layer and which pass into but not entirely through the base layer, the material of the supporting layer comprising an intimate mixture of microporous silica aerogel, reinforcing fibres, and optionally an opacifier, the mixture containing alumina in an amount up to 12% by weight.

As described in our United Kingdom Pat. No. 1433478 this base layer of thermal and electrical insulating material can be such that the heating element is held in position solely by virtue of the frictional grip of such material upon the staples.

It is not essential that the surface of the supporting layer of insulating material be strictly planar and instead it can be given a slight spiral depression when being shaped so as to give assistance in the location of the heating element.

BRIEF DESCRIPTION OF THE DRAWING

A heating unit for a smooth top cooker hob according to the present invention will now be described by way of example with reference to the accompanying drawing which shows a cross-section through the unit.

DESCRIPTION OF THE PREFERRED EMBODIMENT

The unit 10 shown in the drawing includes a dish-shaped base 12 of thermal and electrical insulating material. This material is of the type according to the invention containing microporous silica aerogel, an opacifier such as titanium dioxide and alumina fibres and/or particulate alumina.

As can be seen the base 12 has been moulded to a dish-shape having an annular upstanding side wall 12a and a substantially flat upper surface 14. Directly on this surface 14 rests a spirally arranged helically coiled bare wire heating element 16. To the ends of this element 16 are joined electrical supply leads 18 sheathed with electrical and thermal insulation. The convolutions of the heating element are secured in place by staples 24 which pass into but not completely through the base 12. They are held in position by the frictional grip between the staples and the material of the base 12.

The base 12 sits within an outer protective metal pan 20.

A thin ring 22 of a bonded composition of ceramic fibres rests on the upper edge of the side wall 12a. This ring 22 abuts the underside of a glass ceramic sheet (not shown) when the unit is in position in the cooker hob. As an alternative the base 12 may have a flat upper surface 14 with no annular side wall 12a or only a very small side wall, and a much thicker ring 22 of a bonded composition of ceramic fibres may be provided. The advantage of this is that the ring 22 has a much higher mechanical strength than the material of the base 12. As an alternative the ring 22 can be much thicker.

Because the material of the base 12 contains alumina fibres and/or particulate alumina it has a high resistance to shrinkage at the temperatures of the heating element which can therefore rest directly on the upper surface 14 of the base 12. Thus because there need be no additional disc of ceramic material between the surface 14 and the heating element, the overall depth of the unit 10 can be reduced as compared with the heating unit shown in the above noted United Kingdom Pat. No. 1433478.

EXAMPLE 1

One thermal insulating material according to the invention for use as the base 12, consists of an intimate mixture of:

|  | parts by weight |
|---|---|
| microporous silica aerogel (Aerosil) | 62 |
| titanium dioxide | 31 |
| alumina fibres (Saffil) | 7 |

EXAMPLE 2

Another material according to the invention and containing particulate alumina consists of an intimate mixture of:

|  | parts by weight |
|---|---|
| microporous silica aerogel (Aerosil) | 60 |
| titanium dioxide | 31 |
| alumina silicate fibres | 7 |
| alumina (Alox) | 2 |

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What I claim is:

1. Thermal insulation material comprising an unsintered mixture of microporous silica aerogel and a ceramic material including both ceramic reinforcing fibres and alumina, said alumina being present as at least a portion of said fibres or as particles or as both fibres and particles and said unsintered mixture being formed by intimately mixing as solids said ceramic material and fine particles of said silica aerogel and compacting said intimately mixed solids under pressure to form a self-bonded body, said ceramic material containing said alumina in an amount sufficient to raise the temperature to which said self-bonded body can be heated without significant shrinkage due to sintering of said mixture.

2. Material according to claim 1 which contains from 1 to 7% by weight of alumina fibres.

3. Material according to claim 1 in which said ceramic material consists essentially of alumina fibres.

4. Material according to claim 3 in which the percentage by weight of the components are:
   silica aerogel: 48–97,
   fibres: 1–12,
   opacifier: 2–40.

5. Material according to claim 3 in which the percentage by weight of the components are:
   silica aerogel: 60–73,
   fibres: 2–7,
   opacifier: 25–40.

6. Material according to claim 1 which contains other ceramic fibres and said alumina as an additional component, the percentage by weight of the components being:
   silica aerogel: 50–97
   fibre: 0.5–10
   opacifier: 2–40
   alumina: 0.5–10.

7. Material according to claim 6 in which the percentage by weight of the components are:
   silica aerogel: 60–72
   fibre: 2–7
   opacifier: 25–40
   alumina: 1–5.

8. Material according to claim 1 in which said mixture contains said alumina in an amount up to about 12% by weight.

9. Material according to claim 8 further including an opacifier intimately mixed with said silica aerogel and said ceramic material.

10. Material according to claim 9 in which the opacifier is phase-stabilized black ferrosoferric oxide, iron oxide, manganese dioxide, chromium dioxide, zirconium dioxide, ilmenite, or carbon black.

11. Material according to claim 9 consisting essentially of said aerogel, said ceramic material, and said opacifier.

12. Material according to claim 11 in which said ceramic material consists essentially of said alumina.

13. Material according to claim 12 in which the opacifier is phase-stabilized black ferrsoferric oxide, iron oxide, manganese oxide, titanium dioxide, chromium dioxide, zirconium dioxide, ilmenite, or carbon black.

14. Material according to claim 11 in which the proportion of opacifier is from 5 to 80% of the weight of said silica aerogel.

15. Material according to claim 9 in which the proportion of opacifier is from 2 to 100% by weight of said silica aerogel.

16. Material according to claim 15 in which the proportion of opacifier is from 5 to 80% of the weight of the said silica aerogel.

* * * * *